United States Patent [19]

Mori et al.

[11] Patent Number: 5,544,928
[45] Date of Patent: Aug. 13, 1996

[54] MOUNTING STRUCTURE OF SUN VISOR FOR AUTOMOBILE

[75] Inventors: Kazuhumi Mori, Toyota; Shigemi Sugimori, Aichi; Hitoshi Suga, Nagoya, all of Japan

[73] Assignee: Toyota Jidosha Kabushiki Kaisha, Japan

[21] Appl. No.: 359,549

[22] Filed: Dec. 20, 1994

[30] Foreign Application Priority Data

Dec. 20, 1993 [JP] Japan ................................ 5-344469

[51] Int. Cl.⁶ ........................................................ B60J 3/00
[52] U.S. Cl. ................................. 296/97.9; 296/189; 403/2
[58] Field of Search ...................... 296/97.9, 97.12, 296/97.13, 189; 403/2

[56] References Cited

U.S. PATENT DOCUMENTS

| | | | |
|---|---|---|---|
| 2,357,974 | 9/1944 | Roberts | 296/97.13 |
| 2,939,741 | 6/1960 | Keating et al. | 296/97.13 |
| 4,529,157 | 7/1985 | Suman et al. | 296/97.13 |
| 4,569,552 | 2/1986 | Marks | 296/97.13 |
| 5,031,953 | 7/1991 | Miller | 296/97.9 |
| 5,031,954 | 7/1991 | Peterson et al. | 296/97.9 |
| 5,061,005 | 10/1991 | Van Order et al. | 296/97.9 |
| 5,201,564 | 4/1993 | Price | 296/97.9 |

FOREIGN PATENT DOCUMENTS

| | | | |
|---|---|---|---|
| 2318289 | 10/1973 | Germany | 296/97.13 |
| 57-25861 | 6/1982 | Japan . | |
| 58-48170 | 11/1983 | Japan . | |
| 60-110523 | 6/1985 | Japan . | |
| 60-27687 | 8/1985 | Japan . | |
| 60-40321 | 12/1985 | Japan . | |

*Primary Examiner*—Gary C. Hoge
*Attorney, Agent, or Firm*—Cushman Darby & Cushman, LLP

[57] ABSTRACT

There is disclosed a structure, in which a bracket for supporting a pivotal shaft portion of an arm of a sun visor is mounted on a panel of a vehicle body. The panel has a hole allowing for the insertion of the pivotal shaft portion, and four slits radially extending from the hole.

2 Claims, 9 Drawing Sheets

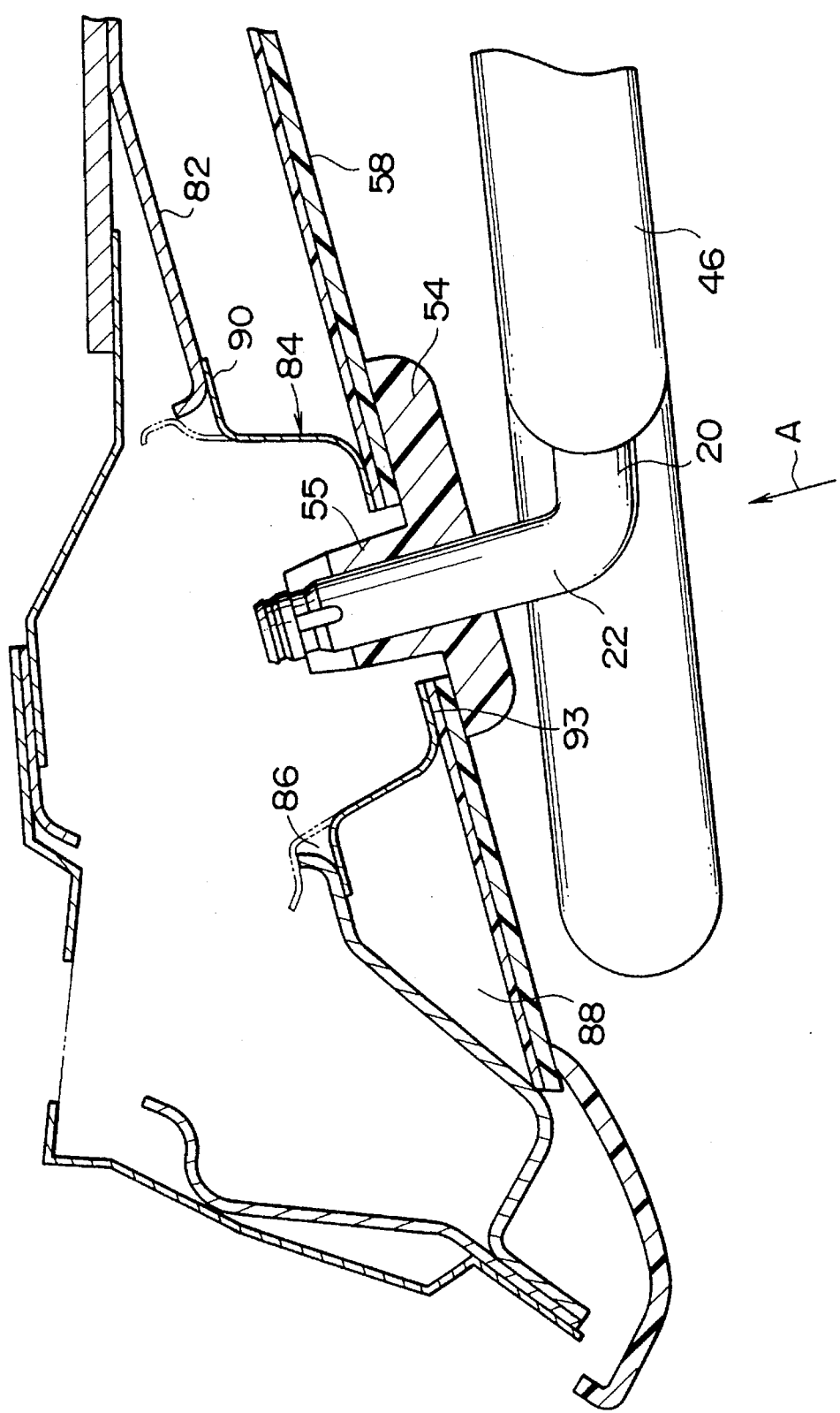

MOUNTING STRUCTURE OF SUN VISOR FOR AUTOMOBILE

BACKGROUND OF THE INVENTION

1. Field of the Invention

This invention relates to a mounting structure of a portion for mounting a bracket of a sun visor for an automobile on a vehicle body.

2. Description of the Related Art

A mounting structure of a sun visor proposed in Japanese Utility Model Publication No. 57-25861 has a notch which is provided on a bracket of the sun visor to form a notch portion thin. When a load of not less than a predetermined value is applied to an arm for supporting the sun visor, the bracket is made to break at the notch portion so as to slip off the sun visor.

In the mounting structure of the sun visor according to the above-mentioned proposal, when a load of not less than a predetermined value is applied to the sun visor to break the bracket, a sharp portion is liable to remain on the broken surface of the bracket.

Incidentally, a sun visor is generally mounted on a joint between a roof and a pillar, which is usually formed by a thick plate in order to ensure the strength of a vehicle body and has usually an overlap of plate work or the like to hold the rigidity of the joint highly. Therefore, it is difficult to substantially absorb impact energy caused by the load of not less than the predetermined value only by breaking the bracket of the sun visor.

SUMMARY OF THE INVENTION

It is an object of the present invention to provide a mounting structure of a sun visor for an automobile, which can reduce a possibility of a sharp portion remaining and can substantially absorb impact energy resulting from the application of a load of not less than a predetermined value.

According to the present invention, there is provided a mounting structure of a sun visor disposed in a room for an automobile, in which a bracket for supporting a pivotal shaft portion of an arm of the sun visor is mounted on a panel of a vehicle body, comprising means capable of absorbing energy based on a load which is applied to the bracket and directed from the inside to the outside of the room by deforming a part or parts disposed outwardly of the bracket.

In one aspect of the present invention, the panel has a hole allowing for the insertion of the pivotal shaft portion, and the means comprises a weak portion provided around the hole. The weak portion may have at least one slit provided on the peripheral edge of said hole. Preferably, a plurality of slits are provided so as to radially extend from the hole, and the panel further has another slit extending from the outer end of one of the radially extending slits in the direction substantially orthogonal to one slit described above, and mounting holes provided on both sides of one slit to mount the bracket.

In another aspect of the present invention, the bracket is further mounted on a ceiling disposed below the panel. The means may comprise: a mounting seat provided on the panel and projected downwards, the ceiling being spaced from the panel so as to come into contact with the mounting seat, while defining a space around the mounting seat; at least one slit provided on a root portion of the mounting seat; and an energy absorption pad disposed in the space. The bracket is attached to the underside surface of the ceiling to mount the bracket on the mounting seat.

In case that the bracket is further mounted on the ceiling, the means may comprise: a fitting fixed to the panel and capable of absorbing energy; the fitting having a connection piece, a pair of spacing pieces extending from both ends of the connection piece in the substantially same direction, and a pair of connected pieces extending from the ends of the pair of spacing pieces so as to be apart from each other; the pair of connected pieces being attached to the panel to mount the fitting on the panel; and the ceiling being spaced from the panel so as to come into contact with the connection piece. The bracket is attached to the underside surface of the ceiling to mount the bracket on the connection piece.

In case that the bracket is further mounted on the ceiling, the ceiling may be spaced from the panel so as to define a space between the ceiling and the panel. The means may comprise: a hole provided on the panel and being larger than the pivotal shaft portion; and a fitting with a flange having claws detachably mounted in the hole of the panel. The fitting is attached to the upside surface of the ceiling, while the bracket is attached to the underside surface of the ceiling to mount the bracket on the fitting.

In case that the panel has at least one slit provided on the peripheral edge of the hole allowing for the insertion of the pivotal shaft portion of the arm of the sun visor, when a load of not less than a predetermined value is applied to the sun visor, the panel is deformed at the peripheral edge of the at least one slit to absorb the impact energy caused by the load. Accordingly, the energy applied to an occupant can be reduced.

An absorption amount of energy can be arbitrarily determined by selecting the shape, number and size of the slit. In addition, since the mounting portion of the sun visor can be determined at the same position as that of the conventional case, it is possible to prevent the sun visor from causing poor visibility or causing the space of a compartment to be narrow.

In case that the panel has another slit extending from the outer end of one of the radially extending slits, and the mounting holes provided on both sides of one slit to mount the bracket of the sun visor, even though the slit take the simple shape, the panel can be substantially deformed by the bracket to absorb the impact energy.

In case that the panel has the mounting seat projected downwards, and the slit provided on the root portion, and the mounting structure has the energy absorption pad disposed in the space around the mounting seat, when a pad of not less than a predetermined value is applied to the sun visor, the mounting seat is plastically deformed due to the slit on the root portion of the mounting seat to absorb the impact energy. When the load is applied off from the mounting seat, the energy absorption pad provided around the mounting seat is deformed to absorb the impact energy.

In case that the mounting structure is provided with the fitting having a so-called hat-shaped section, the impact energy can be absorbed due to the deformation of the fitting itself. Further, since the mounting structure of the present invention copes with the absorption of impact energy by the additional mounting of the fitting and the slight modification of the ceiling, there is no possibility of reducing the rigidity of the panel at the mounting portion of the bracket. Furthermore, an absorption amount of impact energy can be arbitrarily determined by modifying the material, plate thickness and sectional size of the fitting.

In case that the mounting structure is provided with the fitting with the flange having the claws detachably mounted in the hole of the panel, when a load of not less than a predetermined value is applied, the claws are detached from the hole of the panel, and the impact energy is absorbed due to the deformation of the claws or the flange at the time of detachment. Further, an absorption mount of impact energy can be arbitrarily determined by modifying the material and plate thickness of the fitting, and the shape of the flange or the claw.

BRIEF DESCRIPTION OF THE DRAWINGS

The foregoing and other objects and features of the present invention will become apparent from the following description of preferred embodiments of the invention with reference to the accompanying drawings, in which:

FIG. 11 is a sectional view showing a still further embodiment of a mounting structure of a sun visor for an automobile according to the present invention; and FIG. 12 is a view showing the mounting structure of the sun visor for the automobile shown in FIG. 11, in which

DETAILED DESCRIPTION OF THE PREFERRED EMBODIMENTS

According to the present invention, there is provided a structure for mounting a bracket, which supports a pivotal shaft portion of an arm of a sun visor, on a panel of a vehicle body, the panel having a hole allowing for the insertion of the pivotal shaft portion. The structure includes means for absorbing energy which may comprise a weak portion having at least one slit provided on the peripheral edge of the hole.

Figure 1:
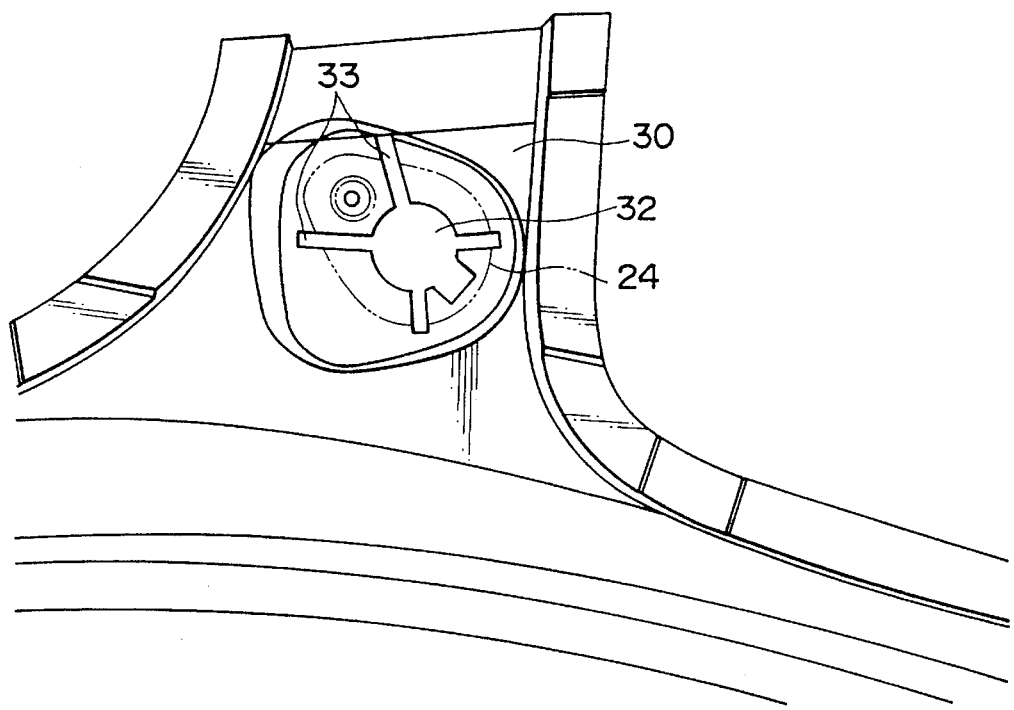
FIG. 1 is a perspective view showing an embodiment of a panel used for a mounting structure of a sun visor for an automobile according to the present invention.
Figure 2:
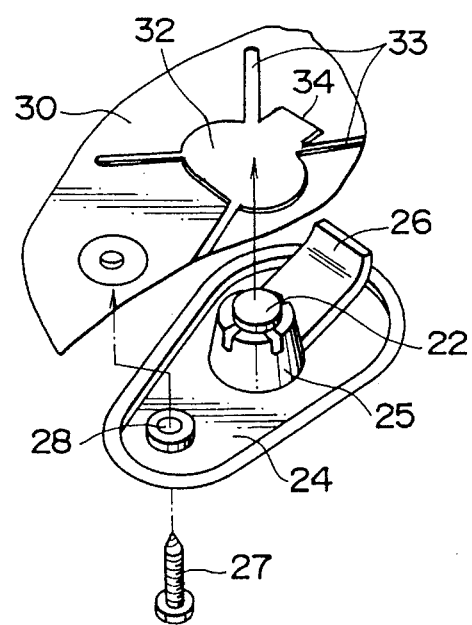
FIG. 2 is a perspective view showing a bracket of a sun visor mounted on the panel shown in FIG. 1 together with the panel.

In an embodiment shown in FIGS. 1 and 2, a bracket 24 for rotatably supporting a pivotal shaft portion 22 of the arm takes the planar shape of an ovoid as a whole, and supports the pivotal shaft portion 22 with a boss 25 provided on an approximate center of the bracket. The pivotal shaft portion 22 is prevented from coming out from the boss 25 by a pin as is known in the art. The bracket 24 is provided with a hook piece 26 for mounting the bracket 24 on a panel 30 of the vehicle body, and a hole 28 allowing for the piercing of a screw 27.

On the other hand, the panel 30 has a hole 32 allowing for the insertion of the pivotal shaft portion 22 of the arm, and four slits 33 radially extending from the hole 32. The hole 32 takes the shape of a key in a word, and the boss 25 and the hook piece 26 of the bracket 24 can be inserted into the hole 32. In the embodiment shown in FIG. 1, the slits 33 extend slightly in excess of the bracket 24, when the bracket 24 is mounted on the panel 30.

The bracket 24 is inclined to insert the hook piece 26 of the bracket 24 obliquely from below into the hole 32 of the panel 30. In this state, when the bracket 24 is raised so as to bring the bracket 24 close to the panel 30, the hook piece 26 is caught by an upper-side edge 34 of the hole 32 of the panel 30. Then, the screw 27 is inserted into the hole 28 in this state, and screwed into the panel. In this manner, according to the embodiment, the bracket 24 can be mounted on the panel 30 with one screw 27.

Figure 3:
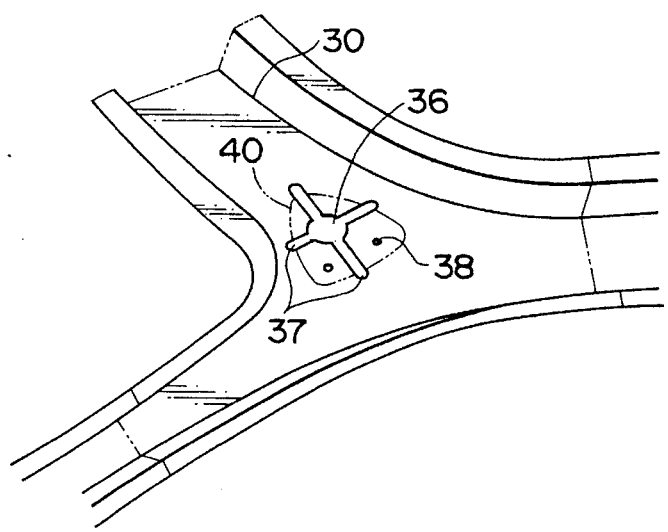
FIG. 3 is a perspective view showing another embodiment of a panel used for a mounting structure of a sun visor for an automobile according to the present invention.

In an embodiment shown in FIG. 3, the panel 30 has a round hole 36 allowing for the insertion of a pivotal shaft portion of the arm, and four slits 37 radially extending from the hole 36. Further, two screws 38 for mounting a bracket 40 are screwed into both side portions of one of the slits 37. In this embodiment, the bracket 40 is similar in planar shape to that shown in FIGS. 1 and 2. However, the bracket 40 has no hook piece and can be mounted on the panel 30 with two screws 38. Incidentally, imaginary lines described on the panel 30 represent the sectional shape of the panel 30.

Figure 4:
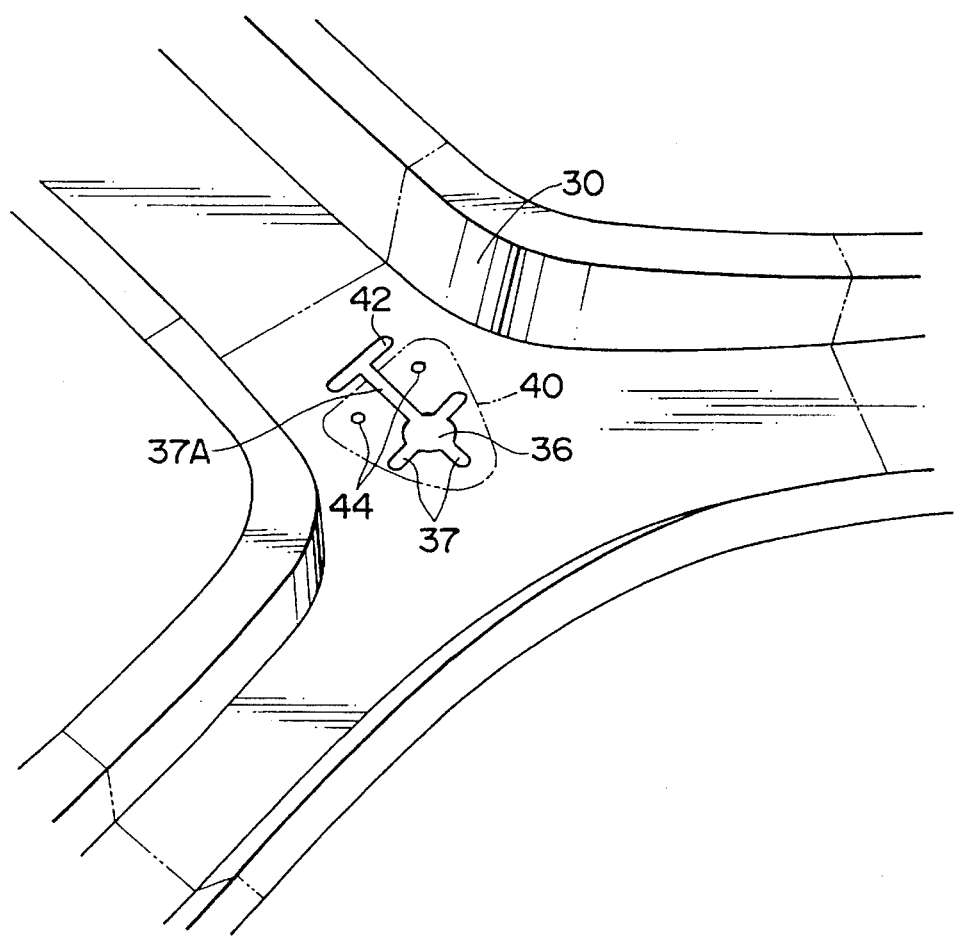
FIG. 4 is a perspective view showing a further embodiment of a panel used for a mounting structure of a sun visor for an automobile according to the present invention.

In an embodiment shown in FIG. 4, the panel 30 has a hole 36, four slits 37 radially extending from the hole 36, a slit 42 extending from the outer end of one slit 37A among four slits in the direction substantially orthogonal to the slit 37A, and mounting holes 44 provided on both sides of the slit 37A to mount the bracket 40. As shown in the drawing, the slit 42 may take the L-like shape in cooperation with the slit 37A, in addition to the T-like shape in cooperation with the slit 37A. Herein, the meaning of what the panel 30 has the mounting holes 44 covers that the panel 30 has holes resulting from mounting the bracket 40 on the panel 30 with tapping screws, in addition to previously opened holes.

Preferably, the length of each of four slits 33 in the embodiment shown in FIG. 1, each of four slits 37 in the embodiment shown in FIG. 3 and each of three slits 37 in the embodiment shown in FIG. 4 is determined such that the contour defined by connecting the outer ends of the slits is approximately coincident with the contour of the bracket 24 or 40.

Figure 5:
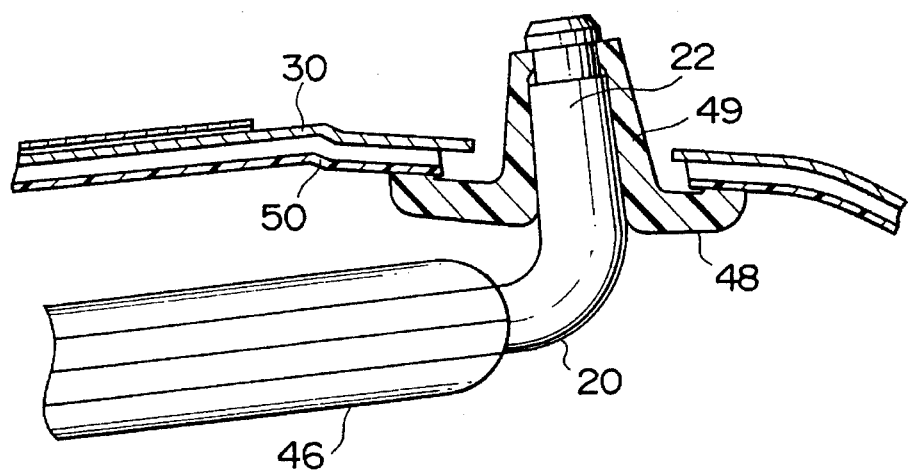
FIG. 5 is a sectional view showing a sun visor, a panel and a ceiling mounted according to a mounting structure of the sun visor for an automobile according to the present invention.

As shown in FIG. 5, in fact, a sun visor 46 is mounted on the arm 20 rotatably around the axis thereof, and the pivotal shaft portion 22 of the arm is supported rotatably by a boss 49 of a bracket 48. The pivotal shaft portion 22 and the boss 49 are inserted into the hole 32 or 36 of the panel 30, and the bracket 48 is mounted on the panel 30 through a roof head lining, that is, a ceiling 50.

Figure 6:
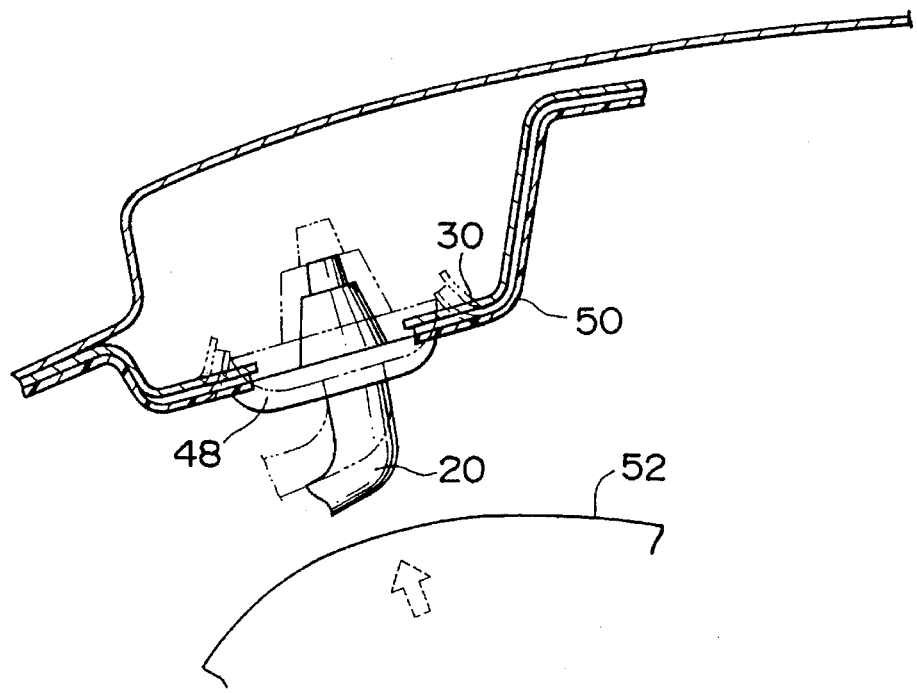
FIG. 6 is a sectional view showing the operation of a mounting structure of a sun visor for an automobile according to the present invention.

When a load of not less than a predetermined value is applied from the head 52 of an occupant to the arm 20, the panel 30 is deformed at the slits or in the neighborhood thereof to absorb impact energy caused by the load described above, as shown by imaginary lines of FIG. 6. Accordingly, the energy exerting an influence on the occupant can be reduced.

Figure 7:
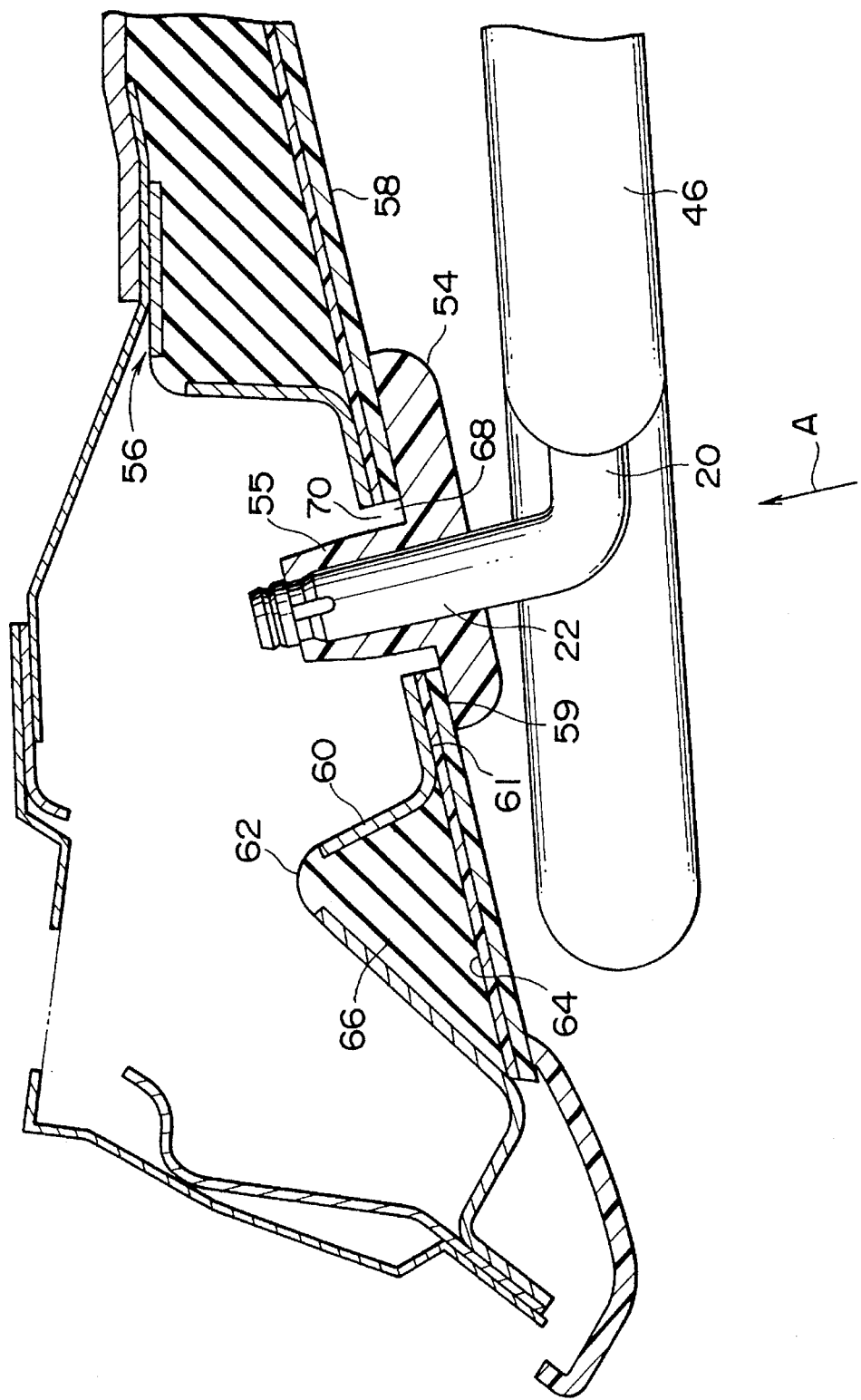
FIG. 7 is a sectional view showing another embodiment of a mounting structure of a sun visor for an automobile according to the present invention.
Figure 8:
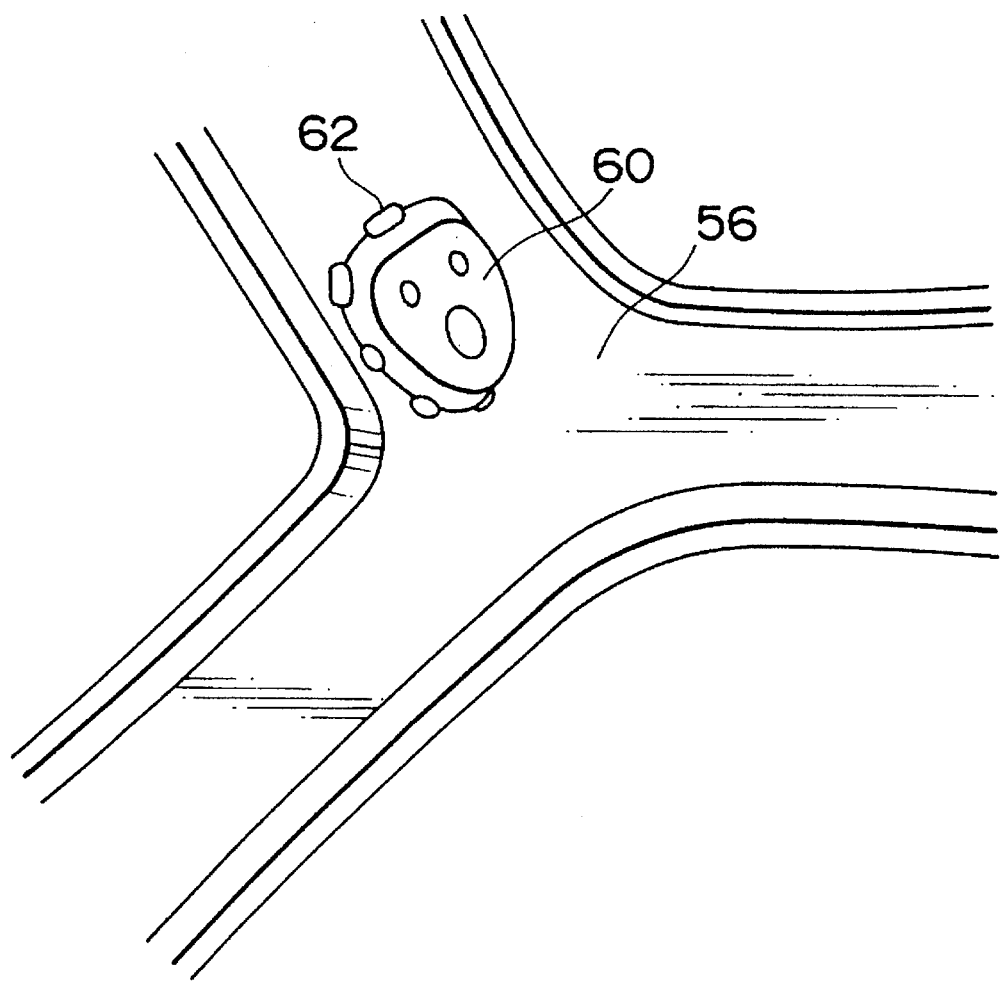
FIG. 8 is a perspective view showing a panel used for the mounting structure of the sun visor for the automobile shown in FIG. 7.

In an embodiment shown in FIGS. 7 and 8, a bracket 54 for supporting the pivotal shaft portion 22 of the arm 20 of the sun visor 46 is mounted on both a panel 56 of a vehicle body and a ceiling 58 disposed below the panel 56. The pivotal shaft portion 22 of the arm is rotatably supported by a boss 55 of the bracket 54.

The panel 56 has a mounting seat 60 projected downwards and at least one slit 62 provided on a root portion of the mounting seat 60. Both the mounting seat 60 and the slit 62 may be obtained by means of press-molding the panel 56. On the other hand, the ceiling 58 is spaced from the panel 56 so as to come into contact with an underside surface 61 of the mounting seat 60, while defining a space 64 around the mounting seat 60. The space 64 is provided in order to absorb or reduce impact energy, and is formed so as to ensure an interval of 15 to 30 mm.

An energy absorption pad 66 made of elastic material, such as blowing urethane rubber is disposed in the space 64, and the ceiling 58 is attached to the underside surface 61 of the mounting seat 60. Both the pivotal shaft portion 22 of the arm 20 and the boss 55 of the bracket 54 are respectively inserted into a hole 68 of the ceiling and a hole 70 of the panel 56, and the bracket 54 is attached to an underside surface 59 of the ceiling 58. Then, the bracket 54 is mounted on both the ceiling 58 and the panel 56 with two tapping screws (not shown).

When a load of not less than a predetermined value is applied from the head of an occupant in the direction indicated by an arrow A, the mounting seat 60 is plastically deformed due to the slit 62 provided on the root portion of the mounting seat 60 to absorb the impact energy. Accordingly, the energy exerting an influence on the occupant can be reduced. When the head of the occupant is struck against a portion other than the mounting seat 60, the energy absorption pad 66 is deformed to absorb the impact energy.

In an embodiment shown in FIGS. 9 and 10, a fitting 74 fixed to a panel 72 is used for mounting the bracket 54, which supports the pivotal shaft portion 22 of the arm 20 of the sun visor 46, on both the panel 72 of a vehicle body and the ceiling 58 disposed below the panel 72.

The fitting 74 is capable of absorbing energy and takes the so-called hat shape composed of a connection piece 76, a pair of spacing pieces 77 respectively extending from both ends of the connection piece 76 in the substantially same direction, and a pair of connected pieces 78 respectively extending from the ends of the pair of spacing pieces 77 so as to be apart from each other. The pair of connected pieces 78 are attached to the panel 72 to mount the fitting 74 on the panel 72 by welding or screwing.

The ceiling 58 is spaced from the panel 72 so as to come into contact with the connection piece 76 of the fitting 74 and ensures a space 80 for the absorption of energy. The space 80 is formed so as to have an interval of 15 to 30 min. The energy absorption pad similar to that of the embodiment shown in FIG. 7 can be also disposed in the space 80.

The ceiling 58 is attached to the connection piece 76 of the fitting 74, and the bracket 54 is attached to the underside surface 59 of the ceiling 58 to mount the bracket 54 on both the ceiling 58 and the connection piece 76 of the fitting 74 with two tapping screws (not shown).

Figure 9:
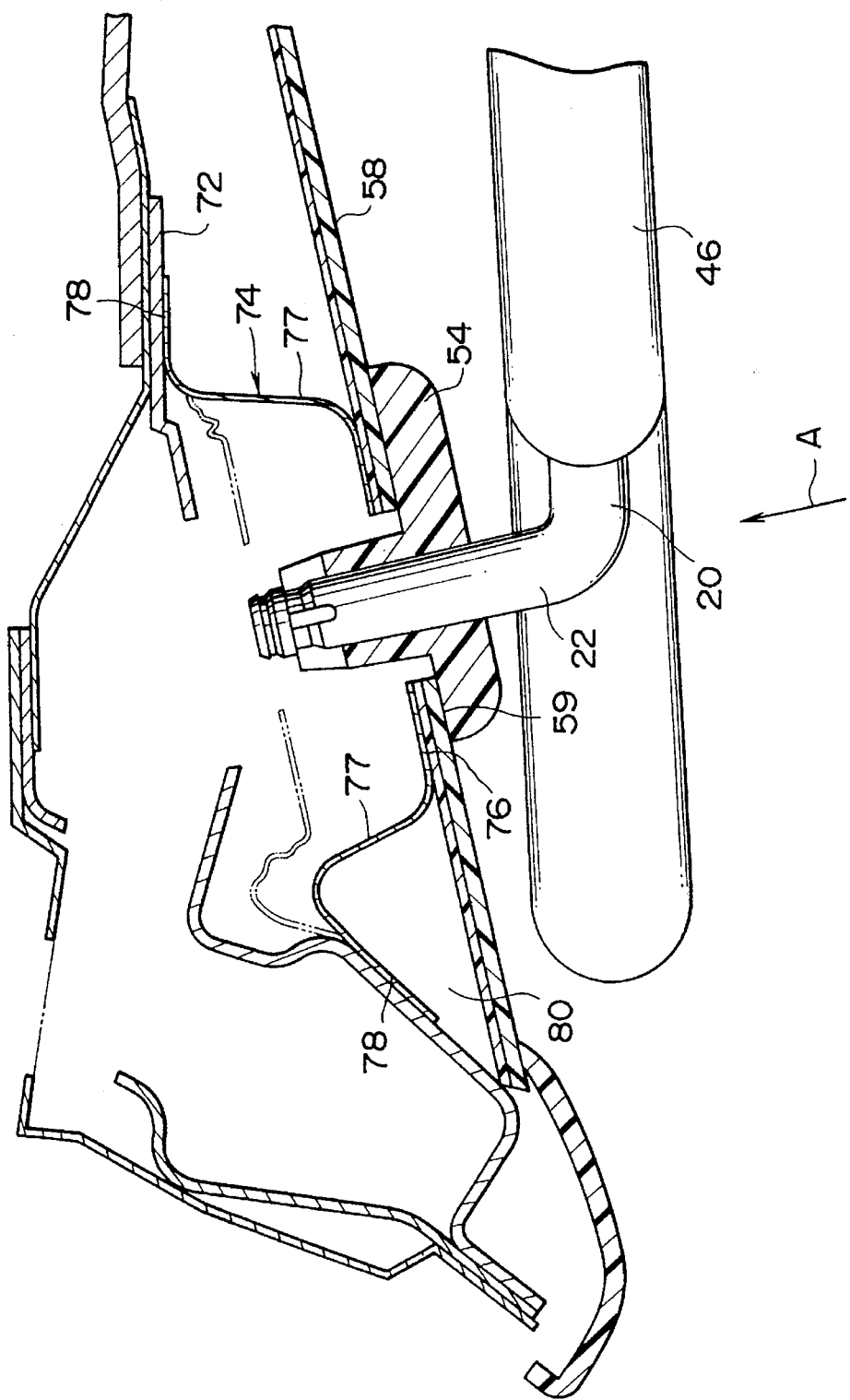
FIG. 9 is a sectional view showing a further embodiment of a mounting structure of a sun visor for an automobile according to the present invention.
Figure 10:
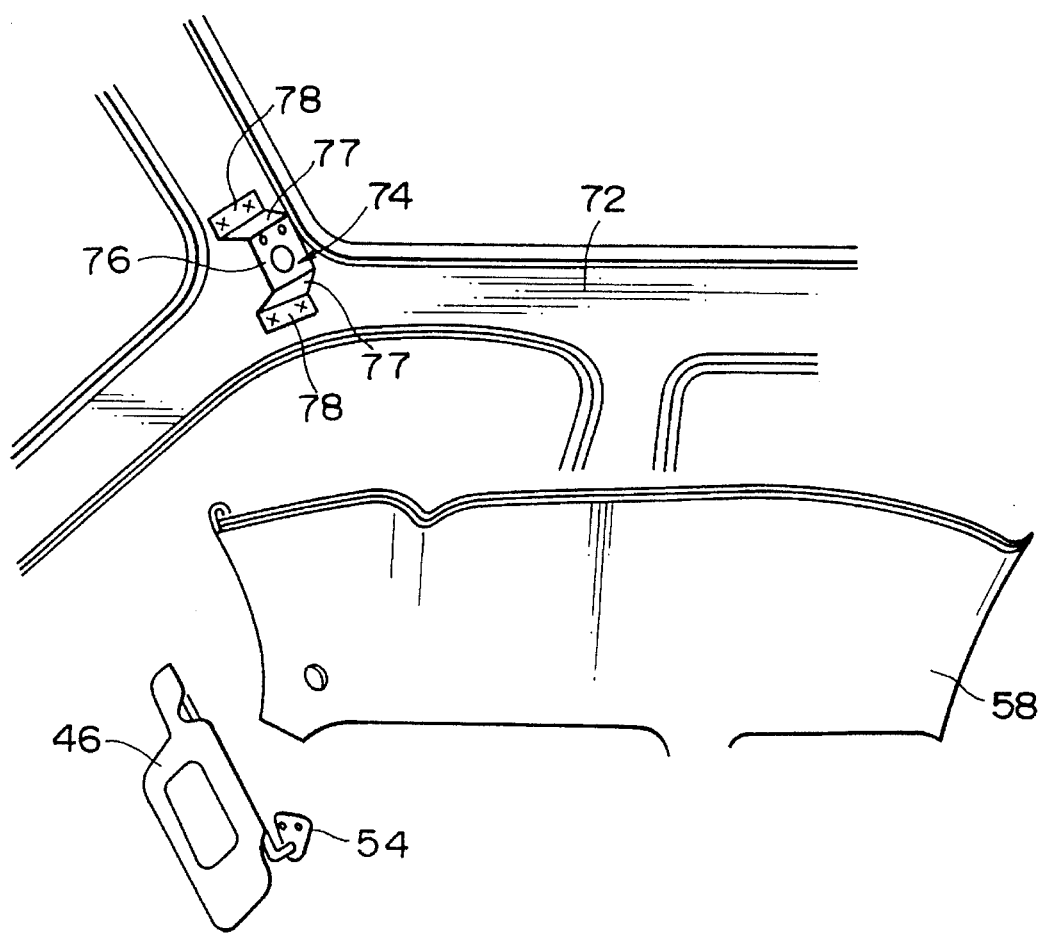
FIG. 10 is an exploded perspective view showing a sun visor, a ceiling and a panel used for the mounting structure of the sun visor for the automobile shown in FIG. 9.

When a load of not less than a predetermined value is applied from the head of an occupant in the direction indicated by an arrow A, both the spacing pieces 77 and the connection piece 76 of the fitting 74 are deformed to absorb the impact energy, as shown by imaginary lines of FIG. 9. Accordingly, the energy exerting an influence on the occupant can be-reduced.

Figure 12A:
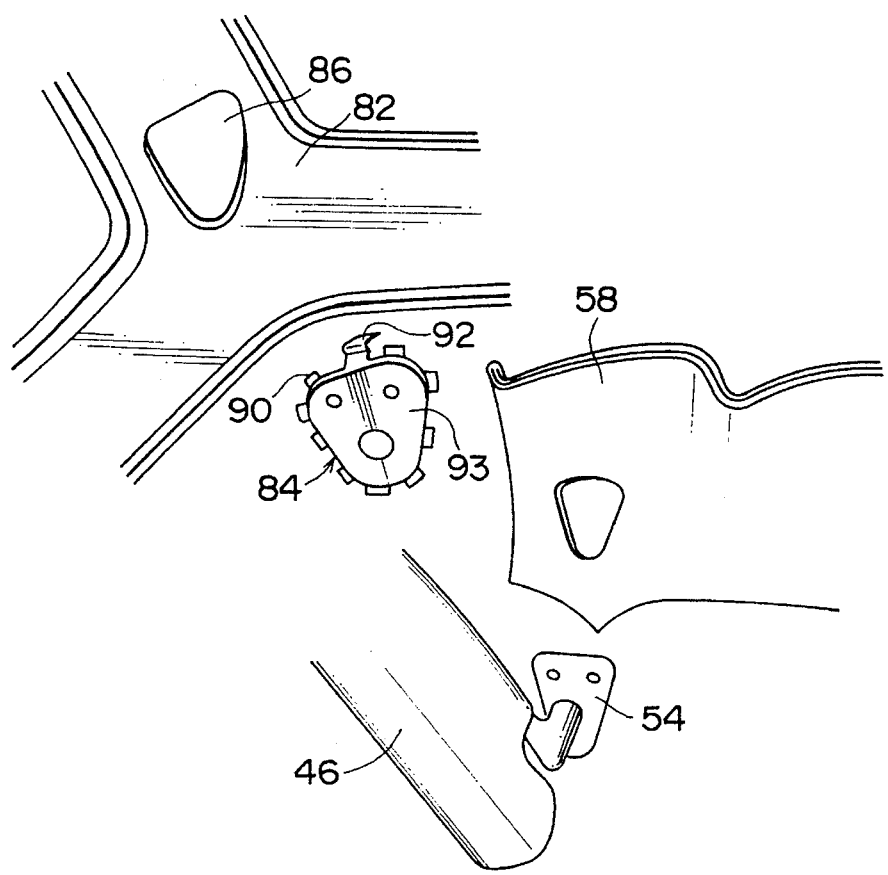
FIG. 12(a) is an exploded perspective view showing a panel, a fitting, a ceiling and the sun visor.
Figure 12B:
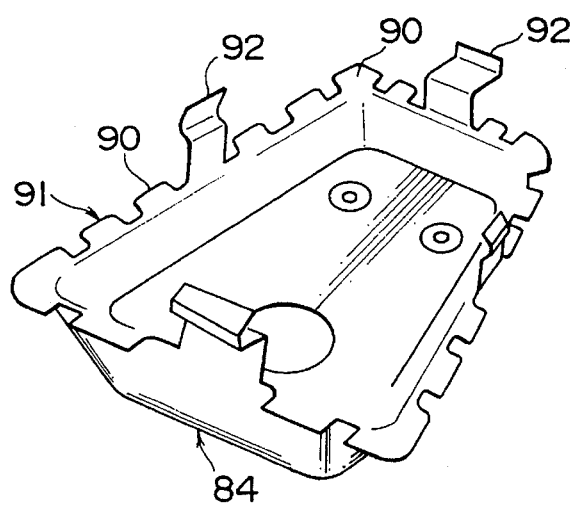
FIG. 12(b) is a perspective view showing the fitting.

In an embodiment shown in FIGS. 11 and 12, a fitting 84 made of a steel plate is used for mounting the bracket 54, which supports the pivotal shaft portion 22 of the arm 20 of the sun visor 46, on both a panel 82 of a vehicle body and the ceiling 58 disposed below the panel 82.

The panel 82 has a hole 86 larger than the pivotal shaft portion 22, i.e., larger than the boss 55 of the bracket 54 in the illustrated embodiment. On the other hand, the ceiling 58 is spaced from the panel 82 so as to define a space 88 between the ceiling 58 and the panel 82. The space 88 is formed so as to have an interval of 15 to 30 mm.

The fitting 84 is provided with a flange 91 having a plurality of claws 90 detachably mounted in a hole 86 of the panel 82. In the embodiment shown in FIG. 12, the flange 91 is provided with a plurality of claws 92 larger than the claws 90, in addition to the claws 90. The number of claws 90 is more than the number of claws 92. The claws 92 are fitted in the hole 86 of the panel 82, and the claws 90 are applied to the underside surface of the panel 82 to mount the fitting 84 on the panel 82.

The fitting 84 integrally has a connection piece 93 spaced from the flange 91. The connection piece 93 is attached to the upside surface of the ceiling 58, and the bracket 54 is attached to the underside surface of the ceiling to mount the bracket 54 on the connection piece 93 of the fitting 84 with two tapping screws (not shown).

When a load of not less than a predetermined value is applied from the head of an occupant in the direction indicated by an arrow A, the flange 91 or the claws 90 of the fitting 84 are deformed to detach the fitting 84 from the panel 82. The impact energy is absorbed due to the deformation of the flange or claws to reduce the energy exerting an influence on the occupant.

What is claimed is:

1. A mounting structure of a sun visor disposed in a passenger compartment of a vehicle, in which a bracket for supporting a pivotal shaft portion of an arm of the sun visor is mounted on a panel of said vehicle, said mounting structure comprising:

means for absorbing energy based on a load which is applied to the bracket and directed from the inside to the outside of the compartment by deforming at least a portion of said panel disposed outwardly of the bracket, wherein said panel has a hole allowing the insertion of said pivotal shaft portion, and said means comprises a weak portion provided around the hole including at least one slit provided on the peripheral edge of said hole, said at least one slit extending beyond an outer periphery of the bracket when the bracket is mounted on the panel.

2. A mounting structure of a sun visor disposed in a passenger compartment of a vehicle, in which a bracket for supporting a pivotal shaft portion of an arm of the sun visor is mounted on a panel of said vehicle, said mounting structure comprising:

means for absorbing energy based on a load which is applied to the bracket and directed from the inside to the outside of the compartment by deforming at least a portion of said panel disposed outwardly of the bracket, wherein said panel has a hole allowing for the insertion of said pivotal shaft portion, and said means comprises a weak portion provided around the hole;

wherein said weak portion includes a plurality of slits provided on the peripheral edge of said hole and extending radially from said hole, and said panel further has another slit extending from the outer end of one of said radially extending slits in the direction substantially orthogonal to said one slit, and mounting holes provided on both sides of said one slit to mount said bracket.

* * * * *